United States Patent [19]

Enga

[11] 4,257,223

[45] Mar. 24, 1981

[54] ENGINES

[75] Inventor: Bernard E. Enga, Maidenhead, England

[73] Assignee: Johnson, Matthey & Co., Limited, London, England

[21] Appl. No.: 35,827

[22] Filed: May 4, 1979

[30] Foreign Application Priority Data

May 8, 1978 [GB] United Kingdom ............. 18241/78

[51] Int. Cl.$^3$ ............................ F02C 3/14; F02C 6/18
[52] U.S. Cl. ............................... 60/39.04; 60/39.06; 60/39.18 B; 60/723
[58] Field of Search ............ 60/39.04, 39.06, 39.18 B, 60/723

[56] References Cited

U.S. PATENT DOCUMENTS

| 2,624,172 | 1/1963 | Houdry | 60/39.04 |
|---|---|---|---|
| 3,841,270 | 10/1974 | Sokolowski | 122/7 R |
| 3,846,979 | 11/1974 | Pfefferle | 60/39.04 |
| 3,928,961 | 12/1975 | Pfefferle | 60/39.06 |
| 3,940,923 | 3/1976 | Pfefferle | 60/39.06 |
| 4,118,171 | 10/1978 | Flanagan et al. | 60/723 |

Primary Examiner—Louis J. Casaregola
Attorney, Agent, or Firm—Cushman, Darby & Cushman

[57] ABSTRACT

This invention relates to an apparatus and a process for improving the efficiency which may be obtained in the operation of power generation systems which utilize the combustion of fuel.

9 Claims, 2 Drawing Figures

ENGINES

In more detail, a process for generating power comprises the following steps:

(a) compressing air and combusting said compressed air with a fluid fuel in gaseous of microdroplet form in a gas turbine which is drivingly connectable to an electrical power generator;

(b) removing exhaust gases produced by step (a) and adding there to a metered quantity of fuel such that there is present in the resulting mixture a stoichiometric excess of oxygen of at least 1.5% and (c) combusting the mixture produced at step (b) in a gas turbine catalytic combustor to provide mechanical power or steam energy for the said or a second electrical power generator, said catalytic combustor having the form of a unitary monolith including gas channels for the flow of reacting gases of dimensions such that the total pressure drop across the combustor is less than 10%.

This invention relates to an apparatus and a process for improving the efficiency which may be obtained in the operation of power generation systems which utilize the combustion of fuel.

Figure 1:
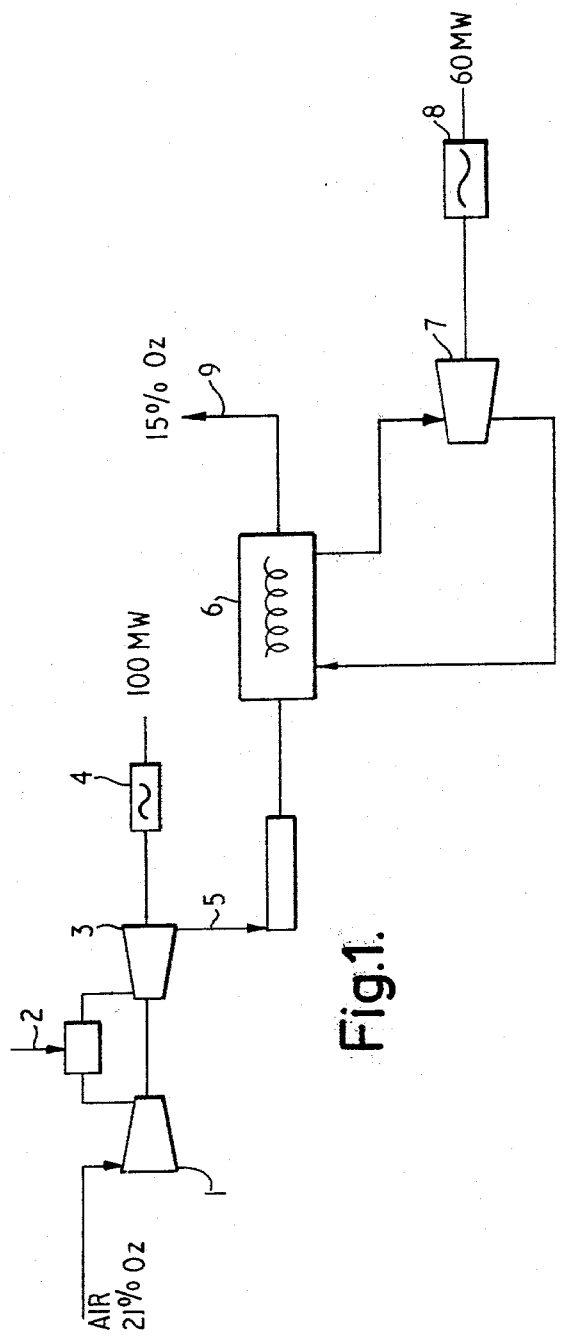

In a conventional power generation system as operated in a gas turbine as shown for example in FIG. 1, air which contains 21% by volume oxygen is compressed in a compressor turbine 1 and reacted with fuel from an injector 2 in gaseous or microdroplet form to drive a power turbine 3 producing 100 megawatts of electricity from generator 4. The turbine exhaust 5 will be a temperature of about 560° C. and contain 15% $O_2$. Such exhaust can be used to "fire" a steam raising boiler 6 driving a steam turbine 7 producing a further 60 megawatts of power from generator 8 and the exhaust 9 is finally vented at 160° C.; the oxygen content remaining unchanged at 15% by volume and oxides of nitrogen lying within the range 40–500 ppm. The total power output of the system is 160 megawatts utilizing 6% of the oxygen content of the atmosphere. The thermal efficiency of the process is low, approximately 37%, owing to the large proportion of oxygen unused.

It is an object of the present invention to improve the thermal efficiency of the above-described process without any appreciable increase in the resulting quantity of oxides of nitrogen which have to be vented to the atmosphere.

According to the present invention a process for the generation of power comprises the following steps:

(a) compressing air and combusting said compressed air with a fluid fuel in gaseous or microdroplet form in a gas turbine which is drivingly connectable to an electrical power generator;

(b) removing exhaust gases produced by step (a) and adding there to a metered quantity of fuel such that there is present in the resulting mixture a stoichiometric excess of oxygen of at least 1.5% and (c) combusting the mixture produced at step (b) in a gas turbine catalytic combustor to provide mechanical power or steam energy for the said or a second electrical power generator, said catalytic combustor having the form of a unitary monolith including gas channels for the flow of reacting gases of dimensions such that the total pressure drop across the combustor is less than 10%.

Preferably a small quantity of fuel is admixed with the exhaust gases from step (c) which are then passed through a $NO_x$ abatement unit (in which the oxides of nitrogen are reduced to nitrogen and water) such as that described in our BP specification No. 1330841 followed by the addition of more oxygen and passage through an oxidation catalyst and heat exchanger.

Under these conditions the second generator used in step (c) will generate a further 160 megawatts of power, the exhaust gases will be vented at 160° C. (before the $NO_x$ abatement, oxidation catalyst and heat exchange units whilst still containing not more than 50 parts per million oxides of nitrogen and 2% oxygen. Thus the system has been improved to produce 260 megawatts of power, the thermal efficiency has been increased to 41% and the oxides of nitrogen vented to the atmosphere have been reduced and eliminated if a subsequent $NO_x$ abatement unit is used.

According to a second aspect of the present invention an alternative to steps (c) and (d) may be used to replace step (c) as follows:

(c) combusting the mixture produced at step (b) in a combustion chamber by the use of a flame, the combustion chamber having such dimensions that the total pressure drop across the chamber is less than 10%, and (d) using exhaust gases from (c) to heat a boiler which is used to drive a steam turbine which is drivingly connectable with the same or a second electrical power generator.

One practical effect of alternative steps (c) and (d) (i.e. a two stage process) is that the overall mechanical efficiency will be somewhat less than the use of a single stage gas turbine catalytic combustor. The alternative embodiment, however, still constitutes a very useful improvement over prior art processes. The subsequent additional stages of $NO_x$ abatement, oxidation catalyst and heat exchanger units may also be used with the alternative embodiment.

Figure 2:
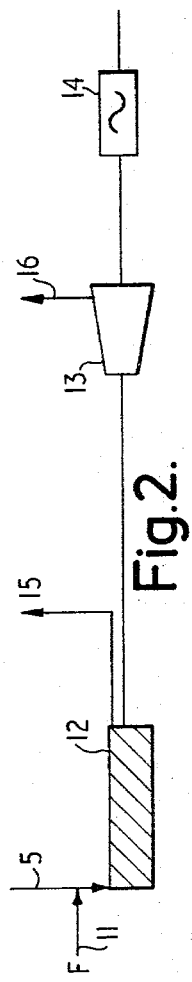

In FIG. 2 of the accompanying drawings, the improvement to the prior art processes constituted by the present invention is depicted diagrammatically.

In the first aspect of the present invention, the exhaust gases 5 from the turbine as before will be at 560° C. and contain 15% $O_2$. A further quantity of metered fuel is added at 11 and the mixture produced is combused in a catalytic combustor which is used to "fire" a boiler and steam turbine shown by the numerals 12 and 13. Turbine 13 is connected to the same or another electrical power generator 14 generating a further 160 megawatts of electricity.

Exhaust gases are vented at 15 and the steam at 16.

In the second embodiment of the invention the numeral 12 in FIG. 2 denotes the flame combustion chamber and boiler combined with the other numerals having the same significance.

In the catalytic combustor the monolith may be ceramic or metallic. In the operation of this invention we prefer an overall pressure drop of not more than six inches water gauge. Large celled ceramic monoliths may be used e.g. 200 cells per square inch but we prefer thin walled metallic monoliths.

According to a third aspect of the present invention apparatus for the generation of electric power comprises a gas turbine catalytic combustor for the combustion of fuel, a primary generator drivingly connected therewith, means for the addition of further fuel to the exhaust gases from the gas turbine, a flame combustion chamber, a boiler, steam turbine and secondary generating turbine operatively connected thereto.

The invention also includes electrical power when generated by a process or apparatus according to the invention.

A washcoat may be applied to the monolith before it is coated with the catalyst. The washcoat could be a high surface area, refractory metal oxide such as beryllia, magnesia or silica, alumina or combinations of metal oxides such as boria-alumina or silica-alumina.

Preferably the metallic monolith is formed from one or more metals selected from the group comprising Ru, Rh, Pd, Ir and Pt. However base metals may be used or base metal alloys which also contain a platinum group metal component may be used.

The walls of the metallic monolith preferably have a thickness within the range 2–4 thousandths of one inch. The preferred characteristics of the metallic monolith having catalyst deposited thereon are (i) that it presents low resistance to the passage of gases by virtue of its possession of a high ratio of open area to blocked area and (ii) that it has a high surface to volume ratio.

Suitable platinum group metals for use in fabrication of the metallic monolith are platinum, 10% rhodium platinum and dispersion strengthened platinum group metals and alloys as described in British Pat. Nos. 1280815 and 1348876 and U.S. Pat. Nos. 3,689,987, 3,696,502 and 3,709,667.

Suitable base metals which may be used are those capable of withstanding rigorous oxidising conditions. Examples of such base metal alloys are nickel and chromium alloys having an aggregate Ni plus Cr content greater than 20% by weight and alloys of iron including at least one of the elements chromium (3–40) wt.%, aluminium (1–10) wt.%, cobalt (0–5) wt.%, nickel (0–72) wt.% and carbon (0–0.5) wt.%. Such substrates are described in German OLS No. 2450669.

Other examples of base metal alloys capable of withstanding the rigorous conditions are iron-aluminium-chromium alloys which may also contain yttrium. The latter alloys may contain 0.5–12 wt.% Al, 0.1–3.0 wt.% Y, 0.20 wt.% Cr and balance Fe. These are described in U.S. Pat. No. 3,298,826. Another range of Fe-Cr-Al-Y alloys contain 0.5–4 wt.% Al, 0.5–3.0 wt.% Y, 20.0–95.0 wt.% Cr and balance Fe and these are described in U.S. Pat. No. 3,027,252.

Base metal alloys which also contain a platinum group metal component are useful as a catalytic metallic monolith in very fierce oxidising conditions, for example in catalysis of the combustion in gas turbine engines. Such alloys are described in U.S. Pat. No. 4,061,495 and German DOS No. 2530245 and contain at least 40 wt.% Ni or at least 40 wt.% Co, a trace of 30 wt.% Cr and a trace to 15 wt.% of one or more of the metals Pt, Pd, Rh, Ir, Os and Ru. The alloys may also contain from a trace to the percentage specified of any one or more of the following elements:

|    | % by weight |
|----|-------------|
| Co | 25          |
| Ti | 6           |
| Al | 7           |
| W  | 20          |
| Mo | 20          |
| Hf | 2           |
| Mn | 2           |
| Si | 1.5         |
| V  | 2.0         |
| Nb | 5           |
| B  | 0.15        |
| C  | 0.05        |

-continued

|    | % by weight |
|----|-------------|
| Ta | 10          |
| Zr | 3           |
| Fe | 20          |
| Th and rare earth metals or oxides. | 3 |

Where the metallic substrate is composed either substantially or solely of platinum group metal it may be in the form of an interwoven wire gauze or mesh or corrugated sheet or foil. Where the metallic substrate is composed substantially of base metal it is preferably in the form of corrugated sheet or foil. These types of base metal monoliths are also described in German OLS No. 2450664 and they may be used in boilers according to the present invention. Such base metal monoliths may have deposited thereon a first layer comprising an oxygen containing coating and a second and catalytic layer. The oxygen containing coating is usually present as an oxide selected from the group consisting of alumina, silica, titania, zirconia, hafnia, thoria, beryllia, magnesia, calcium oxide, strontium oxide, barium oxide, chromia, boria, scandium oxide, yttrium oxide and oxides of the lanthanides. Alternatively, the oxygen in the first layer is present as an oxygen containing anion selected from the group consisting of chromate, phosphate, silicate and nitrate. The second catalytic layer may, for example, comprise a metal selected from the group consisting of Ru, Rh, Pd, Ir, Pt, Au, Ag, an alloy containing at least one of the said metals and alloys containing at least one of the said metals and a base metal. The first and second layers may be deposited or otherwise applied to the monolith as described in German OLS No. 2450664.

Alternative catalytic monoliths are the structures defined in British Patent Application No. 51219/76 dated Dec. 8, 1976.

In British Patent Application No. 51219/76 there is described a catalyst comprising a metallic substrate having deposited thereon a surface coating consisting of one or more intermetallic compounds of the general formula $A_xB_y$ where A is selected from the group consisting of Al, Sc, Y, the lanthanides, Ti, Zr, Hf, V, Nb and Ta and x and y are integral and may have values of 1 or more.

In British Patent Application No. 51219/76 the surface coating of intermetallic compound is, preferably, in the form of a thin film ranging in thickness from 2 to 15 microns.

Many compounds of the type AxBy are miscible with one another and structures in which the surface coatings deposited upon the said metallic substrate contains more than one compound of the type AxBy are within the scope of this invention.

When the metallic compound is deposited in the form of a coating not more than 15 microns thick upon the surface of a metallic substrate, excessive brittleness is absent and the coated substrate may be handled normally.

A number of different techniques may be employed to produce a coating in the form of a thin film of intermetallic compound upon the surface of the metal metallic monolith. For example, aluminium may be deposited onto the surface of rhodium-platinum gauzes by a pack-aluminising process. In this process the gauzes are packed into a heat-resistant container in an appropriate mixture of chemicals such that aluminium is transferred via the vapour phase to the gauze surface. At the aluminising temperature, typically 800°–900° C., interaction between the platinum and aluminium occurs to give the required intermetallic compound.

Alternatively, chemical vapour deposition from $Zr Cl_4$ can be used to form a layer of $Pt_3Zr$, or electrodeposition may be used either from aqueous or fused salt electrolysis to give the requisite compound.

Whichever method is adopted the objective is to form a layer of a firmly adherent, intermetallic compound on the wires of the gauge pack or other substrate.

In another technique, the metals forming the intermetallic compound are prepared as an appropriate solution in water or an organic solvent. The compound is caused to deposit upon the metallic substrate or gauze by the addition of a reducing agent.

The metallic substrate is placed in the solution whilst the precipitation is taking place and becomes coated with a uniform, microcrystalline layer of the intermetallic compound.

I claim:

1. A process for generating power comprising the following steps:
   (a) compressing air and combusting said compressed air with a fuel in a gas turbine which is drivingly connectable to an electrical power generator;
   (b) removing exhaust gases produced by step (a) and adding thereto a metered quantity of fuel such that there is present in the resulting mixture a stoichiometric excess of oxygen of at least 1.5%;
   (c) combusting the mixture produced in step (b) in a catalytic combustor in the form of a monolith including gas channels for the flow of reacting gases of dimensions such that the total pressure drop across the combustor is less than 10%; and
   (d) using the combustor to fire a steam boiler and using the steam so produced to drive a steam turbine which is drivingly connectable to an electrical power generator.

2. A process according to claim 1 wherein a small quantity of fuel is admixed with the exhaust gases from step (c) which are then processed to reduce any oxides of nitrogen therein to nitrogen and water.

3. A process according to claim 1 wherein the monolith supports a catalyst and is made from a material selected from the group consisting of a ceramic or metallic support material.

4. A process according to claim 1 wherein the electrical power generator used in steps (a) and (d) is the same generator.

5. A process according to claim 1 wherein said fuel is used in gaseous form.

6. A process according to claim 1 wherein said fuel is used in micro-droplet form.

7. A process according to claim 1 wherein said monolith is unitary.

8. A process according to claim 1 wherein said monolith is made from a metallic material constituting a catalyst and selected from the group consisting of platinum group metals, alloys of platinum group metals, and alloys of base metal and a platinum group metal.

9. A process according to claim 3 wherein the monolith has applied thereto a first coating of a high surface area refractory metal oxide selected from the group consisting of beryllia, magnesia, silica and combinations of the metal oxides boria-alumina and silica-alumina, and a second coating of a catalytic material.

* * * * *